Figure 1:
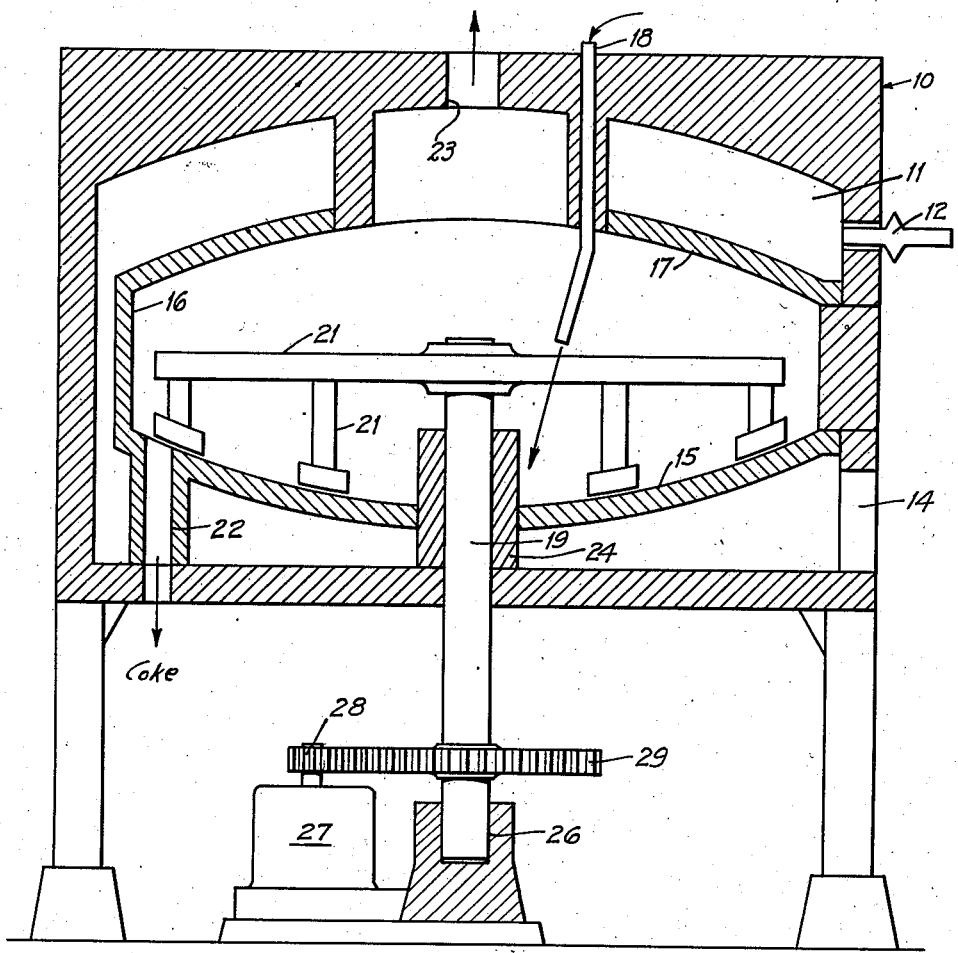

Dec. 18, 1945.  A. C. MOHR  2,391,328

PRODUCTION OF SULPHUR DIOXIDE

Filed Feb. 1, 1943

INVENTOR
ALBERT C. MOHR
BY
ATTORNEY

Patented Dec. 18, 1945

2,391,328

UNITED STATES PATENT OFFICE 2,391,328

PRODUCTION OF SULPHUR DIOXIDE

Albert C. Mohr, Arcadia, Calif., assignor to Stauffer Chemical Company, a corporation of California Application February 1, 1943, Serial No. 474,345

1 Claim. (Cl. 23—178)

This invention relates to the utilization of the acid remaining from an alkylation operation wherein an olefin hydrocarbon and a paraffin hydrocarbon are condensed in the presence of strong sulphuric acid. The invention is concerned with a processing of the sulphuric acid remaining to form sulphur dioxide which is used for various purposes such as conversion into sulphuric acid.

Alkylation sludge, the term applied to the strong acid remaining after the alkylation operation, is really not a sludge at all; it should not be confused with and must be differentiated from acid sludges dealt with heretofore and usually resulting from the refining of petroleum. The sulphuric acid remaining after the alkylation operation contains from 80% to 90% sulphuric acid, from 5% to 8% total carbon, about 1% free oil and from 4% to 8% of unsaturated hydrocarbon. That portion of its content classified as sulphuric acid includes considerable free sulphur dioxide.

I have found that alkylation sludge can be freed of its sulphuric acid content by heating the sludge to a comparatively high temperature, about 600° F. under conditions such that the sludge is subject to complete and uniform heating. As suitable equipment I have employed a Mannheim furnace, a device heretofore employed for heating or roasting various other materials. The sludge is introduced as a cold liquid stream into the furnace hearth. A portion of it is converted into coke which is removed as a dry, acid coke while the volatilized portion, consisting mainly of $SO_2$, sulphuric acid as such and in complex form and volatilized hydrocarbon, is taken off. This gas stream is suitable, after further treatment, for conversion into sulphur trioxide. The subsequent treatment for the distillation products includes high temperature burning with air until only carbon dioxide, water and sulphur dioxide are present in the gas, together with diluent nitrogen and excess air. Additional alkylation sludge can be introduced into the combustion chamber because the hydrocarbons present assist in the burning of the alkylation sludge. However, additional sludge need not be burned when the hydrocarbons are burned out of the $SO_2$ gas if this is available or desirable. After the burning, the gas can be cooled, dried, filtered, reheated and passed into the usual sulphuric acid converter.

In general, the broad object of the present invention is to provide a process for conversion of the acid values in alkylation sludge to sulphur dioxide by a simple and convenient process.

The practice of the invention and other features and objects of the invention will become further apparent upon considering the following detailed description of a preferred manner of practicing the invention: In the drawing accompanying and forming a part hereof Figure 1 is a side elevation partly in section and somewhat diagrammatic in form showing a suitable Mannheim furnace construction which I have successfully employed.

Figure 2:
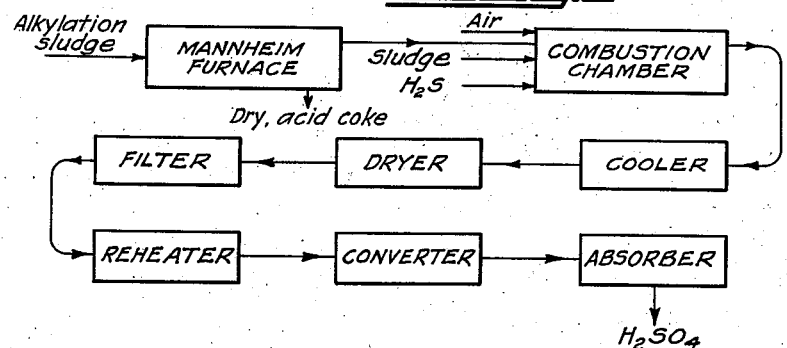

Figure 2 is a flow sheet of a typical operation within the present invention.

Referring to Figure 1 a typical Mannheim furnace is shown as comprising an outer reinforcing shell 10. Within this shell suitable refractory brick work defines a separate combustion chamber 11 wherein gaseous products of combustion from gas burner 12 circulate and are finally removed through combustion gas outlet 14. Supported centrally in the furnace is a hearth structure generally indicated as 16 and comprising an arched top 17 and an arched bottom 15 of suitable refractory material. The products of combustion circulate about this hearth and maintain it at a suitable high temperature. Sludge to be treated is discharged through pipe 18 at approximately the middle of the hearth. A rotating shaft 19 extends through the bottom of the furnace to rotate several rabble arms indicated as 21. Shaft 19 is supported by a suitable bearing 24 in the furnace and by a thrust bearing 26. It is driven from a prime mover 27 through gears 28 and 29. Dry coke formed on the hearth is stirred by the arms and is moved toward the outside of the hearth to be discharged through outlet 22 while the gaseous distillation products given off by the coke pass out through outlet 23.

It is important to note that the products of combustion from the fuel burned in the furnace do not mix with the gaseous products formed or driven off from the acid sludge and that, so far as is practical, no burning of the acid sludge occurs in the hearth. Because of the arched top and bottom of the hearth, the sludge on the hearth is subject to considerable radiant heat so that all portions of it, under agitation by the rabble arms, is heated quite intensely. This I have found essential to the substantial and complete liberation of the acid values from the sludge. The coke removed through outlet 22 is free of any substantial amount of acid or acid values although the coke may have an acid reaction.

Referring to Figure 2, distillation of the sludge on the Mannheim furnace hearth results in the formation of coke and a gas which consists of $SO_2$, sulphuric acid, sulphuric acid complexes and hydrocarbons. This gas is passed into a separate combustion chamber wherein it is burned with air. It is essential that this chamber be maintained at a temperature sufficient to insure decomposition of the sulphuric acid and its complexes. This temperature is preferably 1500° F. and above. Also, sufficient oxygen must be present to insure that the sulphur in the exit gas from the chamber is all in the form of sulphur dioxide with the hydrogen and carbon burned to water and carbon dioxide. To facilitate and hasten the decomposition, I preferably burn a fuel in the chamber. This can be natural gas, fuel oil, additional alkylation sludge, hydrogen sulphide or sulphur. The combustion chamber is so designed that very intense radiant heat is applied to the gases in the chamber. This insures complete combustion of all hydrogen and sulphur present; the final products out of the combustion chamber are in the form of carbon dioxide, water and sulphur dioxide. This gas, preferably containing sufficient oxygen for conversion of the $SO_2$ to $SO_3$, is passed through a cooler wherein the temperature is suitably lowered. After this, most of the water having been removed by condensation in the cooler, the gas is dried by contact with strong sulphuric acid. The remaining gas is then filtered to remove any ash or mist carried through from previous operations. After this the gas is reheated, passed through a converter and then into an absorber wherein the sulphur trioxide is absorbed in strong sulphuric acid.

A typical detailed operation, set forth by way of illustration only, is as follows:

Alkylation sludge was passed through a Mannheim furnace at the rate of 2200 pounds per hour. In the furnace it was heated to a temperature of approximately 600° F., the temperature in the combustion zone 11 being at approximately 1500° F. The gas driven off from the acid sludge through outlet 23 was then passed into a second combustion chamber for convenience. Because excess alkylation sludge was available, 1190 pounds of alkylation sludge were introduced together with 58 pounds of fuel oil and 1190 pounds of hydrogen sulphide. Sufficient air was also introduced to insure that the products issuing from the combustion chamber were in the form of water, sulphur dioxide and carbon dioxide with sufficient oxygen present to insure the subsequent conversion of sulphur dioxide to sulphur trioxide after cooling, drying and filtering of the sulphur dioxide containing gas.

I wish to point out that the several rabble arms or blades 21 are set, not along the radius of the hearth, but at an angle of about 30° to the radius. When the blades are set along the radius there is no regular motion of the material from the hearth center to the hearth perimeter. By using an angular setting, a definite sludge decomposition zone is set up, the center of the hearth is fairly liquid but, as the material is moved across the hearth, it is gradually thickened and dried. At a point about two feet from the perimeter of the hearth only a dry, pulverulent coke remains. When the sludge is merely stirred on the hearth, as is the case with the normal arm settings, it foams badly and does not decompose with sufficient rapidity to provide an acceptable and practical throughput.

I claim:

A process for the continuous recovery of $SO_2$ from a sulphuric acid sludge containing hydrocarbonaceous material, which comprises the steps of first continuously introducing said sludge into an indirectly heated distillation zone maintained at a heat sufficient to decompose the acid in said sludge and form a gas rich in $SO_2$, continuously agitating said sludge, continuously moving said sludge from the interior of the mass to the outer fringes of the mass by a pushing, spiral agitation, and continuously discharging a substantially dry and acid-free carbonaceous residue from the outer fringes of said mass.

ALBERT C. MOHR.